(12) United States Patent
Nugent, Jr.

(10) Patent No.: US 7,348,501 B1
(45) Date of Patent: Mar. 25, 2008

(54) SCALE HAVING SURFACE PLATE THAT PROVIDES SOLE STRUCTURAL CONNECTION OF ITS SUPPORT MEMBERS

(75) Inventor: Paul F. Nugent, Jr., Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 1157 days.

(21) Appl. No.: 10/024,800

(22) Filed: Dec. 19, 2001

(51) Int. Cl.
*G01G 21/00* (2006.01)
*G01G 21/28* (2006.01)

(52) U.S. Cl. .................. 177/126; 177/199; 177/238; 177/262

(58) Field of Classification Search .......... 177/25.15, 177/126–128, 199, 238, 244, 254, 260, 262, 177/DIG. 9, 211, 229
See application file for complete search history.

(56) References Cited

U.S. PATENT DOCUMENTS

| 4,043,413 | A | * | 8/1977 | Schaenen | 177/126 |
|---|---|---|---|---|---|
| 4,125,168 | A | * | 11/1978 | Ormond | 177/211 |
| 4,203,497 | A | * | 5/1980 | Harris et al. | 177/244 |
| 4,346,771 | A | * | 8/1982 | Persson et al. | 177/262 |
| 4,880,069 | A | * | 11/1989 | Bradley | 177/211 |
| 4,881,606 | A | * | 11/1989 | Halfon et al. | 177/126 |
| 5,139,100 | A | * | 8/1992 | Brauneis | 177/25.15 |
| 5,410,108 | A | * | 4/1995 | Williams et al. | 177/25.15 |
| 5,834,708 | A | * | 11/1998 | Svetal et al. | 177/238 |
| 5,886,302 | A | * | 3/1999 | Germanton et al. | 177/199 |
| 5,955,705 | A | * | 9/1999 | Germanton | 177/126 |
| 6,337,446 | B1 | * | 1/2002 | Hulburt et al. | 177/126 |
| 2003/0111275 | A1 | * | 6/2003 | Sternberg | |

* cited by examiner

*Primary Examiner*—Randy W Gibson
(74) *Attorney, Agent, or Firm*—Maginot, Moore & Beck LLP

(57) ABSTRACT

A scale comprises a pair of elongate support members, each member containing a gauge, which provides an indication of the weight of an item placed across the two members. The members are structurally connected solely via a surface plate adapted to rest on the support members to provide a substantially flat surface to receive items to be weighed.

15 Claims, 1 Drawing Sheet

SCALE HAVING SURFACE PLATE THAT PROVIDES SOLE STRUCTURAL CONNECTION OF ITS SUPPORT MEMBERS

This invention relates to a weigh scale and in particular to an adjustable weigh scale.

BACKGROUND TO THE INVENTION

Scales are widely used in point of sale (POS) systems, in order to weigh items, such as fruit and vegetables, being purchased. These scales comprise four support members arranged into a substantially rectangular support frame, which supports a flat plate onto which items to be weighed are placed. The plate tends to be made of a material, such as glass, which is transparent to radiation utilized to scan bar codes on items being purchased. The bar code scanner is placed in a well beneath the transparent plate. In this way the person operating the POS terminal can both weigh loose items and scan bar-coded items in the same work area.

In some POS systems such as self-checkout terminals a second scale is placed in the bag well in the terminal. This "security" scale is arranged to weigh all of the items placed in a bag in the bag well. This is compared to the weight expected for the items weighed in the first scale and the items scanned by the terminal barcode scanner. The weight of scanned items is entered into the POS control computer in order to facilitate this comparison. If the weight of items in the bag well exceeds the expected weight then a security alert can be activated in order to warn the store personnel of a possible theft or, at least, a misuse of the terminal.

However, the wells containing scanning apparatus and bag wells in different models of POS terminal can be quite different in size, which leads manufacturers to require to stock a variety of scales in order to fit scales into the various terminals. This is a significant financial and stock keeping problem for manufacturers.

Accordingly, it is a general object of the present invention to overcome or at least mitigate the problems experienced by manufacturers, as identified above.

SUMMARY OF THE INVENTION

According to a first aspect of the invention there is provided a scale comprising a pair of elongate support members, each member containing a gauge which provides an indication of the weight of an item placed across the two members, the members being structurally connected solely via a surface plate adapted to rest on the support members to provide a substantially flat surface to receive items to be weighed. Preferably the gauge is a strain gauge.

In the present description and claims the concept of "structural connection" is intended to mean a connection which provides strength or rigidity, or the like, to a scale.

Preferably, the rigidity of the surface plate is increased as the separation of the two members is increased.

Preferably, the surface plate is transparent to radiation utilized to scan barcodes on items.

Preferably, an electronics box, which is adapted to translate the output of the gauges on the two members into a recognizable weight. The box is located adjacent a first of the two members and the gauge in the second member is coupled to the box via RS232 lead.

Preferably, each member is approximately 19.4 inches (9.4 cm) long.

It is an advantage of the present invention that a single form of scale can be utilized in a variety of different well sizes.

BRIEF DESCRIPTION OF THE DRAWINGS

Embodiments of the invention will now be described, by way of example, and with reference to the drawing in which.

DETAILED DESCRIPTION OF THE PREFERRED EMBODIMENT OF THE INVENTION

Figure 1:
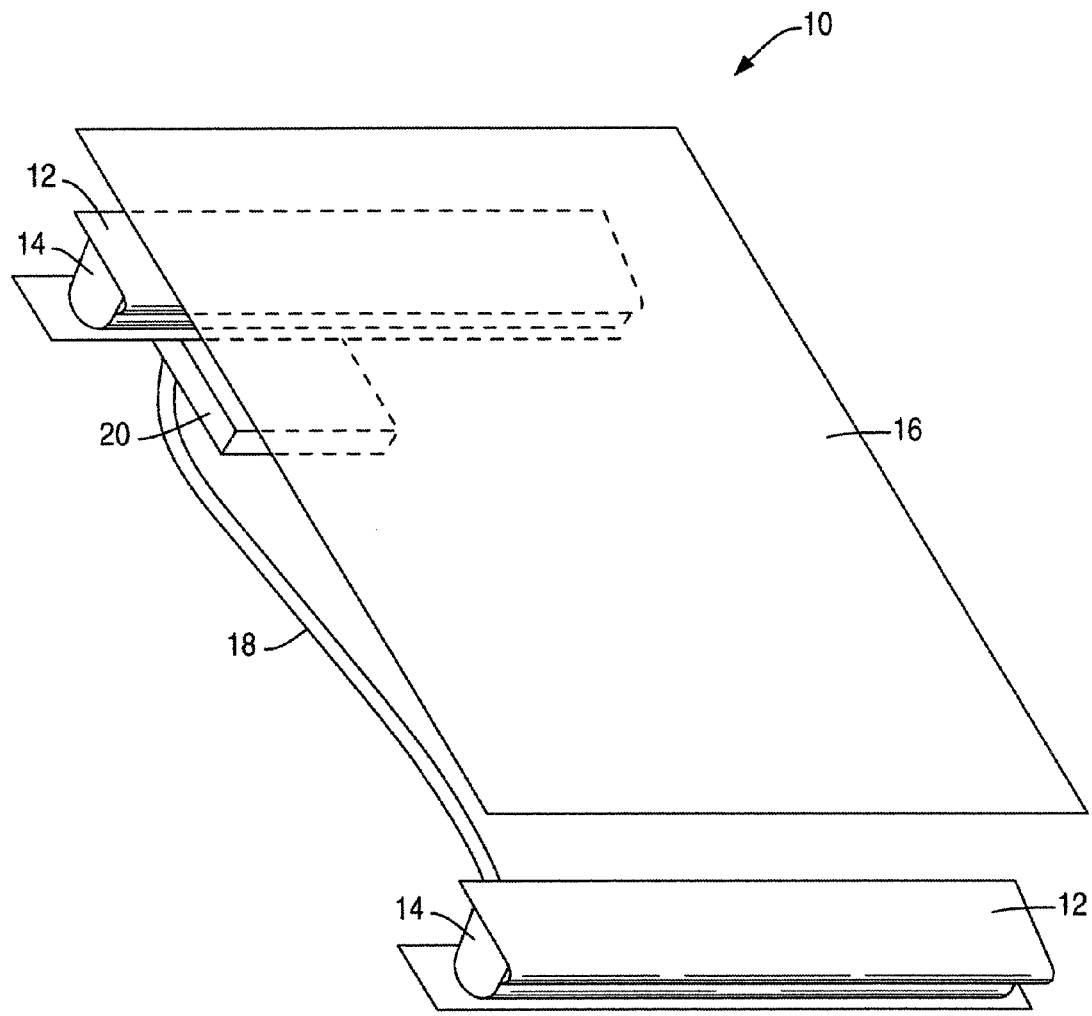
FIG. 1 is an isometric view of a scale in accordance with the present invention.

FIG. 1 illustrates a scale 10 comprising a pair of elongate support members 12, each member 12 containing a gauge 14, which provides an indication of the weight of an item placed across the two members 12. The members 12 are structurally connected solely via a surface plate 16, which is adapted to rest on the support members 12 to provide a substantially flat surface to receive items to be weighed.

The plate 16 my be transparent to radiation utilized to scan barcodes on items, if the scale is to be used in a POS system as the primary scale used by store personnel to weigh produce. However, this is not necessary if the scale is to be used as a security scale in the bag well of a self-checkout POS terminal. However, the rigidity of the surface plate 16 is increased as the separation of the two members 12 is increased. This ensures that the plate does not buckle or twist during use, which would result in an inaccurate weight measurement.

In the preferred embodiment each member is approximately 19.4 inches (9.4 cm) long. A wire 18, in the form of an RS232 lead, connects the gauge in the remote member to an electronics box 20, located adjacent the other member. The electronics box 20 is adapted to translate the readings from the gauges into a recognizable weight measurement.

The gauges are strain gauges, such as those produced by Tedea Huntley International Ltd. and as such will not be described further herein.

Modifications may be incorporated without departing from the scope of the present invention. For example, alternative gauges may be utilized.

The invention claimed is:

1. A scale comprising a pair of elongate support members, each member containing a gauge which provides an indication of the weight of an item placed across the two members, the members being structurally connected solely via a surface plate adapted to rest on the support members to provide a substantially flat surface to receive items to be weighed.

2. A scale as claimed in claim 1, wherein the gauge is a strain gauge.

3. A scale as claimed in claim 1, wherein the rigidity of the surface plate is increased as the separation of the two members is increased.

4. A scale as claimed in claim 1, wherein the plate is transparent to radiation utilized to scan barcodes on items.

5. A scale as claimed in claim 1, comprising an electronics box, which is adapted to translate the output of the gauges of the two members into a recognizable weight.

6. A scale as claimed in claim 5, wherein the box is located adjacent a first of the two members and the gauge in the second member is coupled to the box via RS232 lead.

7. A scale as claimed in claim 1, wherein each member is approximately 19.4 inches (9.4. cm) long.

8. A scale, comprising:

a first gauge assembly having (i) a first gauge operable to generate a first output in response to force being applied thereagainst, and (ii) a first elongated support member positioned in relation to said first gauge such that force applied against said first elongate support member causes force to be applied against said first gauge;

a second gauge assembly having (i) a second gauge operable to generate a second output in response to force being applied thereagainst, and (ii) a second elongated support member positioned in relation to said second gauge such that force applied against said second elongate support member causes force to be applied against said second gauge; and a load plate configured to rest on said first elongated support member and said second elongated support member, wherein said first gauge assembly and said second gauge assembly are structurally connected solely via said load plate when said load plate rests on said first elongated support member and said second elongated support member.

9. The scale of claim 8, wherein said first gauge and said second gauge are each a strain gauge.

10. The scale of claim 8, further comprising an electronics box operable to translate said first output and said second output into a weight value.

11. The scale of claim 10, wherein said first gauge and said second gauge are each coupled to said electronics box.

12. The scale of claim 11, wherein said second gauge is coupled to said electronics box via an RS232 wire.

13. The scale of claim 8, wherein said load plate is transparent to radiation utilized to scan barcodes on items.

14. The scale of claim 8, wherein said first elongated support member and said second elongated support member are each approximately 19.4 inches (9.4. cm) long.

15. The scale of claim 8, wherein said first gauge assembly and said second gauge assembly are freely movable toward and away from each other.

* * * * *